United States Patent
Yamaguchi

(10) Patent No.: US 10,055,683 B2
(45) Date of Patent: Aug. 21, 2018

(54) GROUP INFORMATION STORING AND RECOGNIZING APPARATUS

(71) Applicant: DENSO CORPORATION, Kariya, Aichi-pref. (JP)

(72) Inventor: Hitoshi Yamaguchi, Nisshin (JP)

(73) Assignee: DENSO CORPORATION, Kariya (JP)

( * ) Notice: Subject to any disclaimer, the term of this patent is extended or adjusted under 35 U.S.C. 154(b) by 654 days.

(21) Appl. No.: 14/456,002

(22) Filed: Aug. 11, 2014

(65) Prior Publication Data

US 2015/0100532 A1   Apr. 9, 2015

(30) Foreign Application Priority Data

Oct. 3, 2013   (JP) ................. 2013-208206

(51) Int. Cl.
*G06N 3/063*   (2006.01)
(52) U.S. Cl.
CPC .................. *G06N 3/063* (2013.01)
(58) Field of Classification Search
CPC ...................................... G06N 3/063
See application file for complete search history.

(56) References Cited

U.S. PATENT DOCUMENTS

| 5,258,657 A | 11/1993 | Shibata et al. | |
| 5,519,812 A | 5/1996 | Ishihara | |
| 5,621,336 A * | 4/1997 | Shibata | G06N 3/0635 257/E27.103 |
| 8,311,965 B2 * | 11/2012 | Breitwisch | G06N 3/0635 706/45 |
| 2004/0251949 A1 * | 12/2004 | Shi | G06N 3/0635 327/356 |

FOREIGN PATENT DOCUMENTS

| JP | 07-106528 A | 4/1995 |
| JP | 2003-204257 A | 7/2003 |

OTHER PUBLICATIONS

Pattern Recognition Using N-Input Neuron Circuits Based on Floating Gate MOS Transistors, by Keles, 2009.*
Four quadrant FGMOS analog multiplier, by Keles, 2011.*

* cited by examiner

*Primary Examiner* — Kakali Chaki
*Assistant Examiner* — Daniel Pellett
(74) *Attorney, Agent, or Firm* — Posz Law Group, PLC

(57) ABSTRACT

A plurality of synapse determination circuits are provided on a one-to-one basis for a plurality of gate electrodes of a multi-input gate electrode in a neuron element. With respect to first image regions where "1" is repeatedly inputted in correspondence with group information, the synapse determination circuits corresponding to the first image regions are excitatory synapses. With respect to second image regions where "0" is repeatedly inputted in correspondence with the group information, the synapse determination circuits corresponding to the second image regions are inhibitory synapses.

3 Claims, 8 Drawing Sheets

FIG. 2 INPUT VOL VI1 ~ VIn
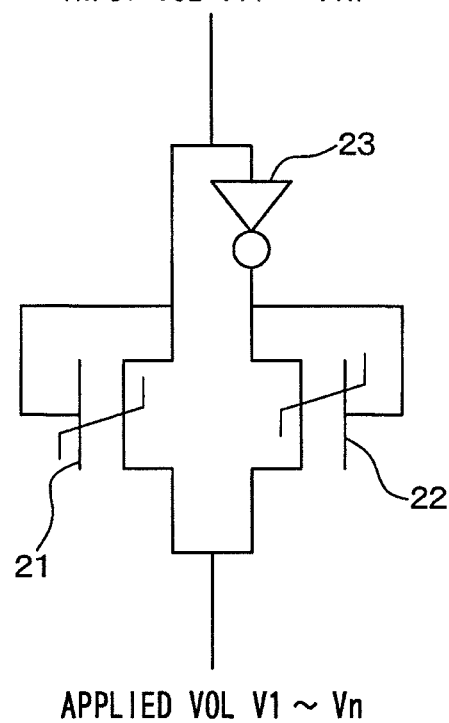
APPLIED VOL V1 ~ Vn
FIG. 3A INPUT VOL = "1"
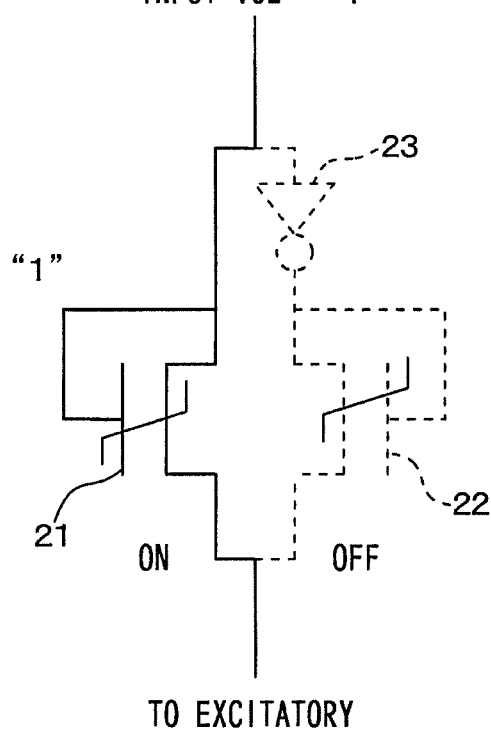
TO EXCITATORY FIG. 4B
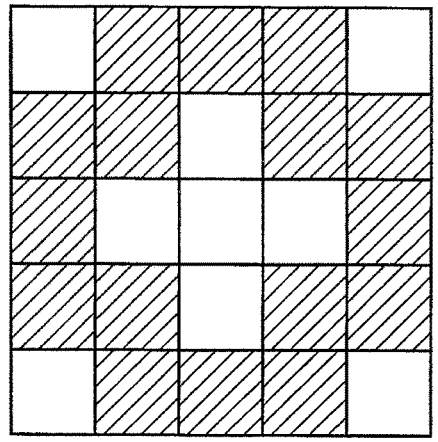
 EXCITATORY:
INPUT VOL = "1" → APPLIED VOL = "1" ;
INPUT VOL = "0" → APPLIED VOL = "0"
 INHIBITORY:
INPUT VOL = "1" → APPLIED VOL = "0" ;
INPUT VOL = "0" → APPLIED VOL = "1"
FIG. 5A
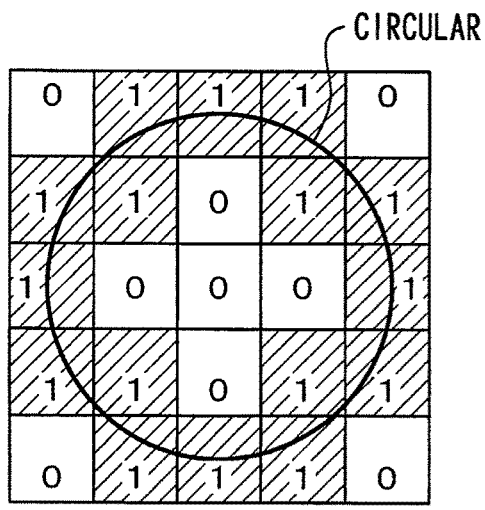
APPLIED VOL VI1 ~ VIn = "1"
φf = Max > Vth
↓
NEURON ELEMENT ON

RECTANGULAR

APPLIED VOL VI1 ~ VIn = "0"
OTHERS = "1"

NEURON ELEMENT OFF

LINEAR

APPLIED VOL VI1 ~ VIn = "1"
OTHERS = "0"

NEURON ELEMENT OFF

APPLIED VOL VI1 ~ Vln = "0"
OTHERS = "1"

↓

NEURON ELEMENT OFF

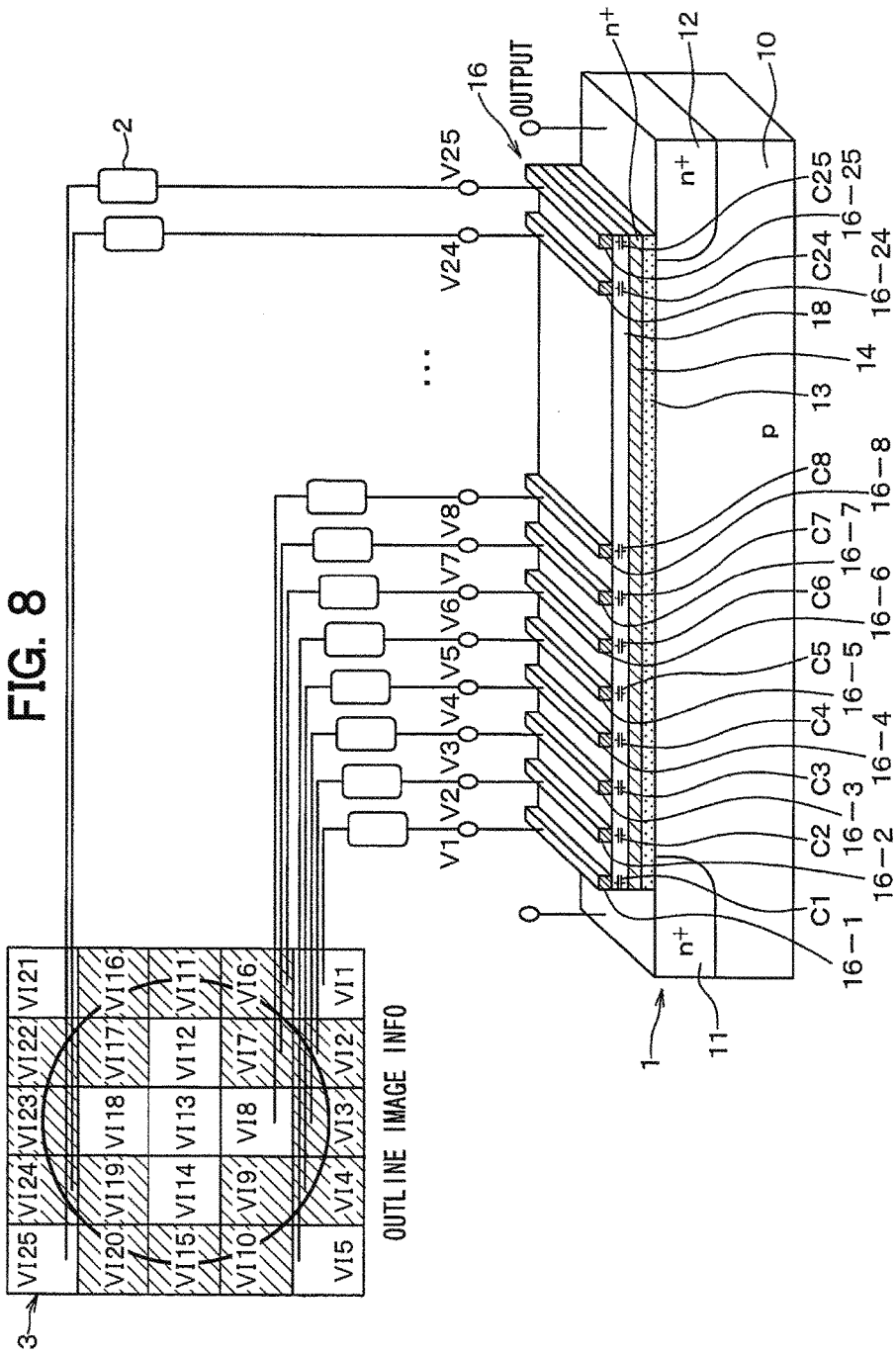

GROUP INFORMATION STORING AND RECOGNIZING APPARATUS

CROSS REFERENCE TO RELATED APPLICATION

The present application is based on Japanese Patent Application No. 2013-208206 filed on Oct. 3, 2013, the disclosure of which is incorporated herein by reference.

TECHNICAL FIELD

The present disclosure relates to a group information storing and recognizing apparatus equipped with a neuron element which stores group information, such as image data indicating a predetermined shape; the apparatus (i) recognizes group information that is inputted and (ii) responds to the inputted group information when the inputted information agrees with the stored group information.

BACKGROUND ART

[Patent Literature 1] JP H07-106528 A (JP 2,929,909 B)

The nerve cells of a human brain (hereafter, referred to as "neuron") have a recognizing ability and a judging ability. For example, a neuron is capable of taking the following action: when a pattern is repeatedly inputted, it stores the pattern; when another pattern is inputted subsequently, it recognizes whether another pattern subsequently inputted is identical with the pattern that is stored; and when another pattern is identical, it outputs a signal in response thereto. The more frequently identical information is repeatedly inputted to a neuron, the more readily the neuron stores the inputted identical information and the more readily the neuron responds when the identical information is inputted. This means that the neuron becomes more responsive to an input signal.

This action depends on the structure of the neuron. Specifically, a neuron is so structured that many synapses are connected and communication is carried out from a synapse corresponding to inputted information to the neuron. When inputted information is identical with stored information, the neuron outputs a signal to other neurons. The more frequently identical information is repeatedly inputted, the tighter the relation between a specific synapse and the neuron becomes. When repeatedly inputted information is inputted again, communication from a specific synapse to the neuron is facilitated and the neuron more easily outputs a signal to another neuron in response thereto.

It has been attempted to implement this function of the human brain with semiconductor. For example, Patent Literature 1 proposes a field-effect transistor forming a neuron element in which a neuron is materialized with semiconductor. With this field-effect transistor, the learning function of the neurons of brains and multi-input parallel processing can be implemented.

This field-effect transistor is formed using, for example, a p-type silicon substrate where a gate insulating film, a floating gate electrode, a ferroelectric film, and a multi-input gate electrode are formed in this order over a channel formed between a source region and a drain region.

The multi-input gate electrode of the field-effect transistor includes a plurality of separated electrodes. In some electrodes, which voltage is applied to, of the plurality of separate electrodes, the polarization occurs in a ferroelectric film provided between the multi-input gate electrode and the floating gate electrode; this accumulates electric charges. The amount of accumulated electric charges is increased with increase in the number of times of voltage application; the capacitance between the electrode to which voltage is applied and the floating gate electrode is increased with increase in the amount of electric charges.

The field-effect transistor is turned on when voltage is applied to the multi-input gate electrode, under the condition that: the potential $\phi f$ generated to the floating gate electrode based on the electric charges accumulated in the ferroelectric film should become equal to or higher than threshold voltage Vth. The potential $\phi f$ generated to the floating gate electrode takes a value corresponding to the total sum of the products of capacitances and applied voltages; each product is of (i) the capacitance in the place of the ferroelectric film between each of the separated electrodes in the multi-input gate electrode and the floating gate electrode and (ii) the applied voltage to each input gate electrode. As mentioned above, larger capacitance arises in the place where (I) voltage is applied to the multi-input gate electrode a larger number of times and (ii) a larger amount of electric charges are accumulated. Therefore, in a place where voltage was applied many times, a larger value is taken by the product of the capacitance and the applied voltage when the voltage is applied in next time.

Supposing a case where the number of times of voltage application is increased to the electrodes located in places corresponding to group information of the electrodes in the multi-input gate electrode. In such a case, when group information is inputted again and voltage is applied to the electrodes corresponding to the group information in the multi-input gate electrode, the field-effect transistor is thereby readily turned on. The field-effect transistor enables multi-input, stores multi-input corresponding to group information, and is readily turned on when group information is inputted. That is, the field-effect transistor is capable of recognizing group information and responding thereto.

However, the above field-effect transistor may respond and output a signal not only when voltage is applied to the electrodes corresponding to group information in the multi-input gate electrode but also when voltage is applied to other electrodes as well. That is, when voltage is applied to electrodes corresponding to group information, the total sum of the products of the capacitances corresponding to the electrodes and the applied voltages is increased and the field-effect transistor is readily turned on. Even when voltage is applied to electrodes other than the electrodes corresponding to the group information, the total sum is accordingly increased. This turns on the field-effect transistor; thus, the neuron element no longer responds only to a stored pattern.

SUMMARY

In consideration of the foregoing, it is an object of the present disclosure to provide a group information storing and recognizing apparatus that includes a neuron element learning group information in a desired pattern and responding only when a pattern identical therewith is inputted.

To achieve the above object, according to a first example of the present disclosure, a group information storing and recognizing apparatus is provided to include a neuron element and a synapse determination circuit. The neuron element includes a first field-effect transistor including the following: a semiconductor substrate including a first semiconductor layer where a channel is formed; a first source region and a first drain region formed in a surface part of the first semiconductor layer; a gate insulating film formed over the channel; a floating gate electrode formed over the gate insulating film; a first ferroelectric film formed over the floating gate electrode and accumulating electric charges according to the number of times of voltage application; and a multi-input gate electrode including a plurality of gate electrodes arranged at intervals over the first ferroelectric film. The synapse determination circuit includes an excitatory synapse and an inhibitory synapse that receive input voltage of high level or low level inputted in correspondence with group information. The excitatory synapse applies a first applied voltage to the multi-input gate electrode, the first applied voltage having a voltage level identical to a voltage level of the received input voltage. The inhibitory synapse applies a second applied voltage to the multi-input gate electrode, the second applied voltage having a voltage level being obtained by inverting the voltage level of the received input voltage. The synapse determination circuit functions as the excitatory synapse when repeatedly receiving the input voltage of high level, and as the inhibitory synapse when repeatedly receiving the input voltage of low level.

In the group information storing and recognizing apparatus, by repeatedly inputting identical group information, input voltages are respectively fixed at high level and low level in correspondence with the group information and brought to the identical levels. For this reason, where voltage of high level is repeatedly inputted in correspondence with the group information, a synapse determination circuit corresponding thereto provides an excitatory synapse. Where voltage of low level is repeatedly inputted in correspondence with the group information, a synapse determination circuit corresponding thereto provides an inhibitory synapse. Through these synapse determination circuits, applied voltage of high level is applied to the gate electrodes of the neuron element and electric charges are accumulated in the ferroelectric film. This makes it possible to cause the neuron element and the synapse determination circuit to learn and store identical group information by repeatedly inputting the group information. In addition, the following can be implemented by, when identical group information is inputted, the synapse determination circuit transmitting applied voltages corresponding to the group information to gate electrodes, respectively: the neuron element recognizes the group information and turns on in response. Therefore, the neuron element is capable of learning group information in a desired pattern and responding only when a pattern identical therewith is inputted.

To achieve the above object, according to a second example of the present disclosure, a group information storing and recognizing apparatus is provided to include the neuron element of the apparatus according to the first example and another excitatory synapse and another inhibitory synapse that receive input voltage of high level or low level inputted in correspondence with group information. Such another excitatory synapse is placed where the input voltage of high level is to be recognized as the group information; the excitatory synapse applies a first applied voltage to the multi-input gate electrode, the first applied voltage having a voltage level identical to the high level of the received input voltage. Such another inhibitory synapse is placed where the input voltage of low level is to be recognized as the group information; the inhibitory synapse applies a second applied voltage to the multi-input gate electrode, the second applied voltage having a voltage level being obtained by inverting the low level of the received input voltage. The above excitatory synapse and inhibitory synapse may be included as another synapse determination circuit included in the group information storing and recognizing apparatus.

The following measure may be taken: in places where of information items contained in group information, those of high level are recognized, only excitatory synapses are placed; and in places where those of low level are recognized, only inhibitory synapses are placed. This makes it possible to obtain a group information storing and recognizing apparatus that stores group information to be recognized without fail.

To achieve the above object, according to a third example of the present disclosure, a group information storing and recognizing apparatus is provided to include (i) another neuron element and (ii) the synapse determination circuit of the apparatus according to the first example or the excitatory synapse and inhibitory synapse of the apparatus according to the second example. Such another neuron element includes a first field-effect transistor including the following: a semiconductor substrate including a first semiconductor layer where a channel is formed; a first source region and a first drain region formed in a surface part of the first semiconductor layer; a gate insulating film formed over the channel; a floating gate electrode formed over the gate insulating film; a first dielectric film formed over the floating gate electrode; and a multi-input gate electrode including a plurality of gate electrodes arranged at intervals over the first dielectric film.

With an excitatory synapse and an inhibitory synapse provided in a synapse determination circuit, even when only synapse determination circuits are provided, group information can be stored in the synapse determination circuits and be recognized thereby. The neuron element only has to respond and turn on when identical group information is inputted based on applied voltage transmitted from synapse determination circuit. Therefore, a neuron element may be formed using a dielectric film in which electric charges are not accumulated according to the number of times of applied voltage application, in place of a ferroelectric film.

BRIEF DESCRIPTION OF THE DRAWINGS

The above and other objects, features, and advantages of the present disclosure will become more apparent from the following detailed description made with reference to the accompanying drawings. In the drawings:

FIG. 2 is a circuit diagram showing an example of a synapse determination circuit;

FIG. 3A is a circuit diagram showing the operation of a synapse determination circuit taken when "1" of input voltage is inputted many times;

FIG. 4B is a drawing showing the synapse of each image region set in a synapse determination circuit when a circular outline image is repeatedly inputted as group information;

FIG. 5A is a drawing showing the states of the input voltage of each image region and the neuron element observed when a circular outline image is inputted as group information;

FIG. 8 is a schematic block diagram of a group information storing and recognizing apparatus in another embodiment of the present disclosure.

DETAILED DESCRIPTION

Figure 1:
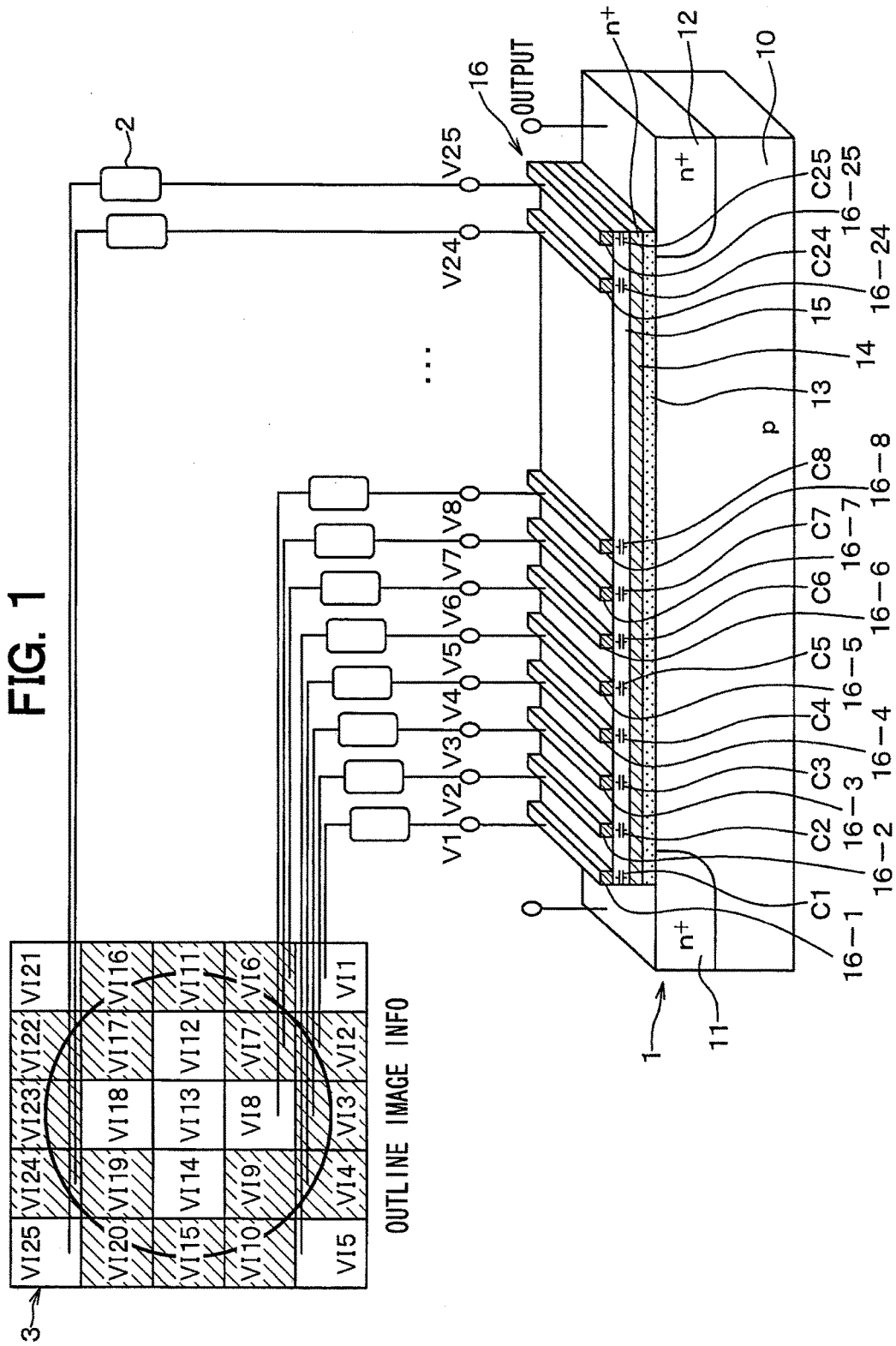
FIG. 1 is a schematic block diagram illustrating a group information storing and recognizing apparatus in a first embodiment of the present disclosure.

Hereafter, a description will be given to embodiments of the present disclosure with reference to the drawings. In the following description of each embodiment, identical or equivalent parts will be provided with identical marks.

(First Embodiment)

A description will be given to a first embodiment of the present disclosure. The group information storing and recognizing apparatus shown in FIG. 1 includes a neuron element 1 and a synapse determination circuit 2. It learns and stores group information inputted from an information input part 3. Further, when group information identical with the stored group information is inputted, the neuron element 1 is turned on in response thereto. The group information includes a plurality of information items.

The neuron element 1 includes a field-effect transistor, which is equivalent to a first field-effect transistor in the present disclosure, formed using a p-type semiconductor substrate 10 formed of p-type silicon. In the surface part of the p-type semiconductor substrate 10, a source region 11 and a drain region 12 are formed to be placed at a predetermined distance from each other. Of the surface of the p-type semiconductor substrate 10, the area between the source region 11 and the drain region 12' is taken as a channel. In the surface of the channel, a gate insulating film 13 is provided. The gate structure of the neuron element 1 is formed by laminating a floating gate electrode 14, a ferroelectric film 15, and a multi-input gate electrode 16 in sequence over the gate insulating film 13 in this order.

The source region 11 and the drain region 12 are formed of an $n^+$-type diffusion layer. They are extended in one direction parallel to the surface of the p-type semiconductor substrate 10 and laid out in parallel at a predetermined distance from each other. The gate insulating film 13 includes an insulating film, such as a silicon oxide film or a silicon nitride film, and formed by, for example, thermal oxidation.

The floating gate electrode 14 is formed of a metal film including high-melting point metal or a polysilicon film doped with an impurity, for instance. In the case of this embodiment, the floating gate electrode 14 is formed of a polysilicon film heavily doped with n-type semiconductor.

The ferroelectric film 15 is a dielectric film formed of a dielectric capable of accumulating electric charges. For example, PZT (lead zirconate titanate: $Pb(Zr,Ti)O_3$), SBZ (oxide of strontium bismuth tantalum: $SrBi_2Ta_2O_9$), strontium titanate: $SrTiO_3$, or barium titanate: $BaTiO_3$ is used for the ferroelectric film 15. The ferroelectric cited here refers to the following dielectric: a dielectric where more electric charges are accumulated by polarization with increase in the number of times of input voltage application (i.e., with increase in an input voltage application count); and the accumulated electric charges are held and thereby remain as polarization information. The electric charges being polarized and accumulated in the ferroelectric film 15 results in the gradual increase of the capacitance formed by the ferroelectric film 15 being sandwiched between the floating gate electrode 14 and the multi-input gate electrode 16.

The multi-input gate electrode 16 is formed of, for example, a metal film including high-melting point metal or a polysilicon film doped with an impurity. The multi-input gate electrode 16 includes a plurality of separated gate electrodes 16-1 to 16-n (n is an integer not less than 2, 25 in the example in FIG. 1). The respective gate electrodes 16-1 to 16-n are extended in one direction parallel to the surface of the p-type semiconductor substrate 10 and arranged at equal intervals in-between. That is, they are arranged in stripes.

The neuron element 1 further includes in the drawing, a source electrode electrically coupled to the source region 11, a drain electrode electrically coupled to the drain region 12, and an interlayer insulating film (unshown). The neuron element 1 is thus configured.

The neuron element 1 carries out the following operation when input voltages corresponding to group information (or a large number of information items included in the group information) are applied to the multi-input gate electrode 16: polarization is caused in the ferroelectric film 15 and electric charges are accumulated. Specifically, the following takes place when positive voltage is applied to any of the gate electrodes 16-1 to 16-n: electric charges are accumulated in the portions of the ferroelectric film 15 located between the gate electrodes 16-1 to 16-n to which positive voltage is applied and the floating gate electrode 14. In addition, the potential of the floating gate electrode 14 is increased according to the amount of electric charges accumulated in each place.

That is, the potential $\phi f$ generated to the floating gate electrode 14 takes a value corresponding to the total sum of the products; each product is of (i) the capacitance in the ferroelectric film 15 between each gate electrode 16-1 to 16-n and the floating gate electrode 14 and (ii) the applied voltage to each gate electrode 16-1 to 16-n. More specifically, the potential $\phi f$ generated to the floating gate electrode 14 is expressed by Formula 1 below. In Formula 1, C1 to Cn are taken for the capacitances between the respective gate electrodes 16-1 to 16-n and the floating gate electrode 14; V1 to Vn are taken for applied voltages; and Ctotal is taken for the value of the total capacitance between the floating gate electrode 14 and the multi-input gate electrode 16. Ctotal is equivalent to the total sum of the capacitances C1 to Cn between the respective gate electrodes 16-1 to 16-n and the floating gate electrode 14 (Ctotal=C1+C2+ - - - Cn).

$$\phi f = (C1V1 + C2V2 + \ldots CnVn)/C\text{total} \quad \text{(Formula 1)}$$

When positive voltage is applied to electrodes corresponding to places high in the amount of accumulated electric charges among the gate electrodes 16-1 to 16-n, the potential applied to the floating gate electrode 14 based thereon becomes higher. When the potential φf generated to the floating gate electrode 14 based on the electric charges accumulated in the ferroelectric film 15 becomes equal to or high than a threshold voltage Vth, the following takes place: a current flows between source and drain through the channel formed in the surface of the p-type semiconductor substrate 10. In the neuron element 1, as mentioned above, a current is let through between source and drain when voltage is applied to desired electrodes among the gate electrode 16-1 to 16-n included in the multi-input gate electrode 16.

The synapse determination circuit 2 determines the levels of applied voltages V1 to Vn to the individual gate electrodes 16-1 to 16-n provided in the neuron element 1 according to the level of voltage inputted from the information input part 3. The synapse determination circuit 2 is provided in correspondence with each of the gate electrodes 16-1 to 16-n. The levels of inputs from the information input part 3 and of applied voltage V1 to Vn are classified into two, high level and low level. In the following description, high level will be represented as "1," and low level be represented as "0." The voltages inputted from the information input part 3 to the synapse determination circuits 2 will be referred to as input voltages VI1 to VIn.

Specifically, the synapse determination circuit 2 provides an excitatory synapse and an inhibitory synapse. When "1" is repeatedly inputted as input voltage VI1 to VIn, it functions as an excitatory synapse; when "0" is repeatedly inputted, it functions as an inhibitory synapse.

When input voltage VI1 to VIn is inputted, the excitatory synapse communicates the same level as the input voltage VI1 to VIn as applied voltage V1 to Vn. That is, the excitatory synapse comprises a through circuit which carries out the following operation: when input voltage VI1 to VIn is "1," it takes "1" for applied voltage V1 to Vn; when input voltage VI1 to VIn is "0," it takes "0" for applied voltage V1 to Vn; and it communicates them to the gate electrodes 16-1 to 16-n.

When input voltage VI1 to VIn is inputted, the inhibitory synapse communicates the level obtained by inverting the input voltage VI1 to VIn as applied voltage V1 to Vn. That is, the inhibitory synapse comprises a NOT circuit which carries out the following operation: when input voltage VI1 to VIn is "1," is takes "0" for applied voltage V1 to Vn; when input voltage VI1 to VIn is "0," it takes "1" for applied voltage V1 to Vn; and it communicates them to the gate electrode 16-1 to 16-n.

In the case of this embodiment, the synapse determination circuit 2 includes first and second MOSFETs 21, 22 and a NOT circuit 23 as shown in, for example, FIG. 2.

The first MOSFET 21 is equivalent to a second field-effect transistor in the present disclosure. The information input part 3 is coupled to the gate electrode and drain electrode of the first MOSFET 21, and input voltage VI1 to VIn is inputted to these electrodes. Each of the gate electrodes 16-1 to 16-n is coupled to the source electrode of the first MOSFET 21. The dielectric forming or providing the gate capacitance of the first MOSFET 21 includes a ferroelectric film. Each time "1" is applied as input voltage VI1 to VIn, polarization is caused in the ferroelectric film and electric charges are accumulated.

The second MOSFET 22 is equivalent to a third field-effect transistor of the present disclosure. The information input part 3 is coupled to the gate electrode and drain electrode of the second MOSFET 22 through the NOT circuit 23. As a result, the voltage of the level obtained by inverting input voltage VI1 to VIn is inputted to these electrodes. Each of the gate electrodes 16-1 to 16-n is coupled to the source electrode of the second MOSFET 22. The dielectric forming or providing the gate capacitance of the second MOSFET 22 also includes a ferroelectric film. Each time "0" is applied as input voltage VI1 to VIn, the level is inverted at the NOT circuit 23. As a result, polarization is caused in the ferroelectric film and electric charges are accumulated.

The NOT circuit 23 applies voltage of the level obtained by inverting input voltage VI1 to VIn to the MOSFET 22.

The synapse determination circuit 2 equipped with the first and second MOSFETs 21, 22 and NOT circuit 23 operates as described below.

When "1" is inputted as input voltage VI1 to VIn many times, "1" is inputted to the gate electrode and drain electrode of the first MOSFET 21 and electric charges are accumulated in the ferroelectric film of the first MOSFET 21. For this reason, when "1" is inputted as input voltage VI1 to VIn to the synapse determination circuit 2, the following takes place: as shown in FIG. 3A, the first MOSFET 21 is turned on (brought into conduction) based on the electric charges accumulated in the ferroelectric film and the input voltage. When "0" obtained by inverting "1" of input voltage VI1 to VIn at the NOT circuit 23 is inputted, the second MOSFET 22 is turned off (brought out of conduction). In this case, therefore, the synapse determination circuit 2 communicates "1" as input voltage VI1 to VIn to the gate electrodes 16-1 to 16-n without change.

Figures 3B, 4A:
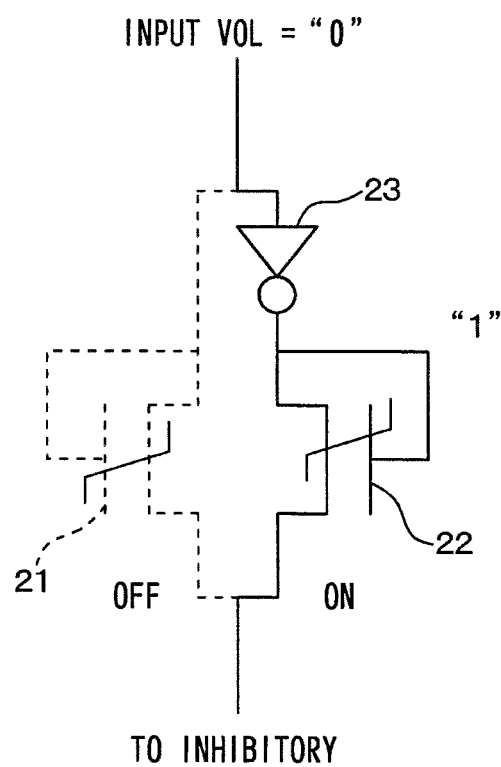
FIG. 3B is a circuit diagram showing the operation of a synapse determination circuit taken when "0" of input voltage is inputted many times.
FIG. 4A is a drawing illustrating the input voltage of each image region observed when a circular outline image is repeatedly inputted as group information.

On the other hand, when "0" is inputted as input voltage VI1 to VIn many times, "0" is inverted into "1" at the NOT circuit 23 and it is inputted to the gate electrode and drain electrode of the second MOSFET 22. Then electric charges are accumulated in the ferroelectric film of the second MOSFET 22. For this reason, when "0" is inputted as input voltage VI1 to VIn to the synapse determination circuit 2, the following takes place: as shown in FIG. 3B, the second MOSFET 22 is turned on based on the electric charges accumulated in the ferroelectric film and the input voltage. When "0" is inputted as input voltage VI1 to VIn, the first MOSFET 21 is turned off (brought out of conduction). In this case, the synapse determination circuit 2 communicates "1" obtained by inverting "0" as input voltage VI1 to VIn to the gate electrodes 16-1 to 16-n.

In contrast, suppose that "1" has been inputted as input voltage VI1 to VIn many times and then "0" is inputted as input voltage VI1 to VIn to the synapse determination circuit 2. In this case, since electric charges have been accumulated in the ferroelectric film, the first MOSFET 21 is turned on. Since electric charges have not been accumulated in the ferroelectric film, the second MOSFET 22 is not turned on. In this case, the synapse determination circuit 2 communicates "0" as input voltage VI1 to VIn to the gate electrodes 16-1 to 16-n without change.

Suppose that "0" has been inputted as input voltage VI1 to VIn many times and then "1" is inputted as input voltage VI1 to VIn to the synapse determination circuit 2. In this case, since electric charges have been accumulated in the ferroelectric film, the second MOSFET 22 is turned on. Since electric charges have not been accumulated in the ferroelectric film, the first MOSFET 21 is not turned on. In this case, the synapse determination circuit 2 communicates "0" obtained by inverting "1" as input voltage VI1 to VIn to the gate electrodes 16-1 to 16-n.

As mentioned above, the synapse determination circuit 2 becomes a through circuit after or when "1" has been inputted as input voltage VI1 to VIn many times. That is, the through circuit outputs "1" when "1" is inputted as input voltage VI1 to VIn, and outputs "0" when "0" is inputted. Thus the synapse determination circuit 2 provides or function as an excitatory synapse. In contrast, after or when "0" is inputted as input voltage VI1 to VIn many times, the synapse determination circuit 2 becomes a NOT circuit. That is, the NOT circuit outputs "1" when "0" is inputted as input voltage VI1 to Vin and outputs "0" when "1" is inputted. Thus the synapse determination circuit 2 provides or function as an inhibitory synapse. As mentioned above, the synapse determination circuit 2 learns whether "1" or "0" has been inputted many times as input voltage VI1 to VIn and thereby provides an excitatory synapse or an inhibitory synapse according thereto.

The information input part 3 is used to input group information such as outline image information and output individual input voltages VI1 to VIn to the synapse determination circuits 2 in correspondence with the group information. In case the information input part 3 is an image input part for inputting outline image information, the following processing is carried out: the inputted outline image is divided into a plurality of image regions by vertically and horizontally partitioning it; and input voltage VI1 to VIn corresponding to the outline image information is generated on an image region-by-image region basis. For example, as illustrated in FIG. 1, an outline image is divided into 25 image regions in a 5 by 5 matrix, and input voltages VI1 to VI25 are respectively generated for the image regions. In case the outline image is in a circular shape, for example, the following processing is carried out: input voltage VI1 to VI25 is set to "1" with respect to the image regions through which the circular outline passes among the divided image regions; and input voltage VI1 to VI25 is set to "0" with respect to the image regions through which the outline does not pass.

The group information storing and recognizing apparatus is configured as mentioned above. In the group information storing and recognizing apparatus, the following takes place by repeatedly inputting identical group information to the information input part 3: each of the input voltages VI1 to VIn is fixed at "1" or "0" in correspondence with the group information and brought to the same, levels.

Thus in an image region where "1" is repeatedly inputted in correspondence with group information, the synapse determination circuit 2 corresponding to the image region provides an excitatory synapse. Since "1" is repeatedly inputted as input voltage VI1 to VIn, electric charges are accumulated in the ferroelectric film of the first MOSFET 21. Then the synapse determination circuit 2 functions as a through circuit and provides an excitatory synapse. In an image region where "0" is repeatedly inputted in correspondence with group information, the synapse determination circuit 2 corresponding to the image region provides an inhibitory synapse. Since "0" is repeatedly inputted as input voltage VI1 to VIn, electric charges are accumulated in the ferroelectric film of the second MOSFET 22. Then the synapse determination circuit 2 functions as a NOT circuit and provides an inhibitory synapse.

Similarly, in an image region where "1" is repeatedly inputted in correspondence with group information, applied voltage V1 to Vn to the gate electrode 16-1 to 16-n corresponding to the image region is set to "1." For this reason, between the gate electrode 16-1 to 16-n corresponding to the image region and the floating gate electrode 14, electric charges are accumulated in the ferroelectric film 15. Meanwhile, also in an image region where "0" is repeatedly inputted in correspondence with group information, applied voltage V1 to Vn to the gate electrodes 16-1 to 16-n corresponding to the image region is set to "1." For this reason, between the gate electrode 16-1 to 16-n corresponding to the image region and the floating gate electrode 14, electric charges are accumulated in the ferroelectric film 15.

As mentioned above, repeatedly inputting identical group information makes it possible to cause the neuron element 1 and the synapse determination circuits 2 to learn and store the group information. When identical group information is inputted, the respective synapse determination circuits 2 communicate the applied voltages V1 to Vn corresponding to the group information to the gate electrodes 16-1 to 16-n. The neuron element 1 recognizes the group information and is turned on in response.

With respect to those to which "1" is repeatedly inputted as input voltage VI1 to VIn among the gate electrodes 16-1 to 16-n, the corresponding synapse determination circuits 2 function as excitatory synapses. With respect to those to which "0" is repeatedly inputted as input voltage VI1 to VIn among the gate electrodes 16-1 to 16-n, the corresponding synapse determination circuits 2 function as inhibitory synapses. For this reason, when group information identical with repeatedly inputted group information is inputted, the following takes place: the input voltage VI1 to VIn is "1" in every synapse determination circuit 2 and positive voltage is applied to all the gate electrodes 16-1 to 16-n of the multi-input gate electrode 16. Since the group information has been repeatedly inputted, electric charges have been accumulated in the ferroelectric film 15 between each gate electrode 16-1 to 16-n and the floating gate electrode 14. Therefore, every capacitance C1 to Cn is increased and has a large value. Positive voltage is applied to every gate electrode 16-1 to 16-n, so that the potential ϕf (Refer to Formula 1 above) generated to the floating gate electrode 14 has a large value and the neuron element 1 is readily turned on.

Meanwhile, in case there is input different from that recognized as group information, the following takes place unlike cases where there is input identical with stored group information: even though the level of input voltage VI1 to VIn is identical in some places, there is a place where the level is not identical. With respect to the places of disagreement, "0" is outputted as applied voltage V1 to Vn from the synapse determination circuit 2 in both (i) case where the synapse determination circuit 2 provides an excitatory synapse and (ii) case where the synapse determination circuit 2 provides an inhibitory synapse. For this reason, positive voltage is not applied to all the gate electrode 16-1 to 16-n or positive voltage is applied only to some gate electrodes 16-1 to 16-n. The potential ϕf generated to the floating gate electrode 14 does not take a large value; thus the neuron element 1 becomes less prone to be turned on.

In the example shown in FIG. 4A, a circular outline image has been repeatedly inputted as group information to store the circular shape in the neuron element 1 and the synapse determination circuits 2. In the image regions through which the outline of the circle passes, the input voltage VI1 to VI25 is "1." In the image regions through which the outline does not pass, the input voltage VI1 to VI25 is "0." For this reason, when group information representing the image outline in this shape is repeatedly inputted, the following takes place as shown in FIG. 4B: places through which the circular outline passes become excitatory synapses and the remaining places through which the outline does not pass become inhibitory synapses.

Therefore, when group information representing a circular shape identical with the circular shape stored as group information is inputted, the following takes place as shown in FIG. 5A: in the synapse determination circuits 2, the applied voltages V1 to V25 to all the image regions are set to "1" and the neuron element 1 is turned on.

Figure 5B:
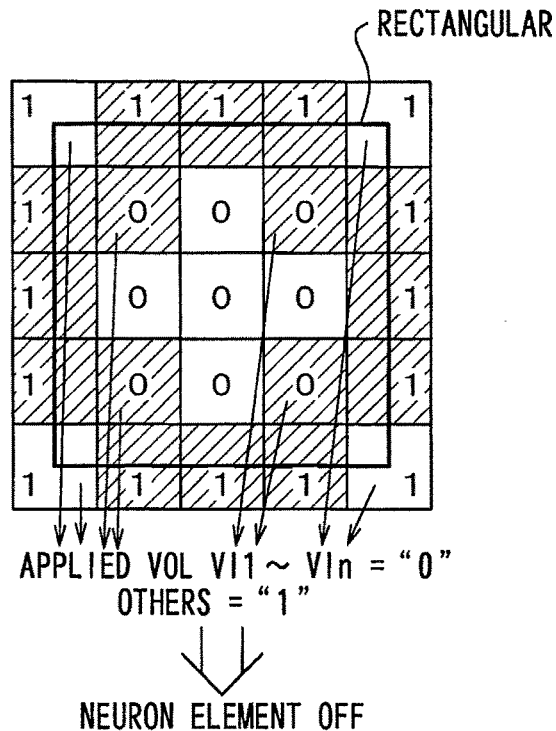
FIG. 5B is a drawing showing the states of the input voltage of each image region and the neuron element observed when a rectangular outline image is inputted as group information.
Figure 5C:
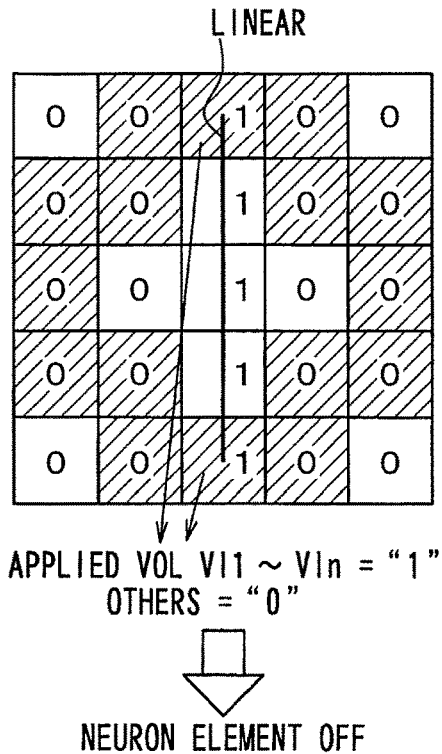
FIG. 5C is a drawing showing the states of the input voltage of each image region and the neuron element observed when a linear outline image is inputted as group information.
Figure 5D:
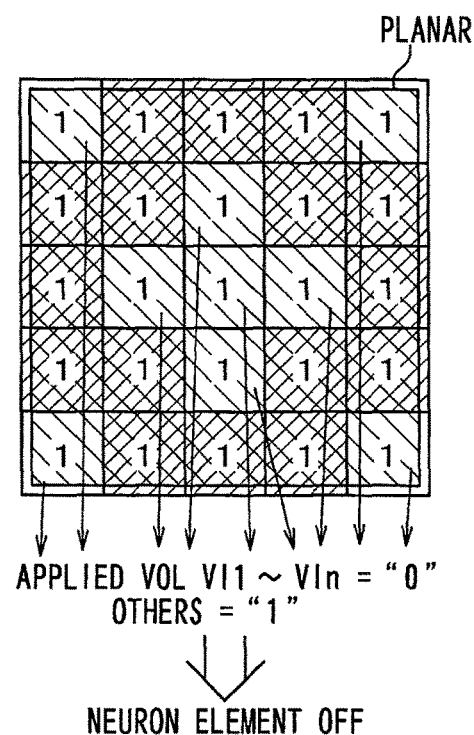
FIG. 5D is a drawing showing the states of the input voltage of each image region and the neuron element observed when a planar outline image is inputted as group information.

Meanwhile, when rectangular, linear, or planar outline image information is inputted as group information as shown in FIG. 5B to FIG. 5D, the following takes place: all the applied voltages V1 to V25 outputted from the synapse determination circuits 2 are not always "1." The input voltages VI1 to VIn are "1" with respect to the image regions through which the outline of each shape passes, and "0" with respect to the image regions through which the outline does not pass. Meanwhile, the applied voltages V1 to V25 outputted by the synapse determination circuits 2 are "1" in the following places: places where the image regions through which the outline of each shape passes agree with the image regions through which the outline of the circular shape passes. The applied voltages V1 to V25 outputted by the synapse determination circuits 2 are "1" also in the following places: places where the image regions through which the outline of each shape does not pass agree with the image regions through which the outline of the circular shape does not pass. In the other places, however, the applied voltages V1 to V25 outputted by the synapse determination circuits 2 are "0." As a result, both "1" and "0" are present in the applied voltages V1 to V25 outputted from the synapse determination circuits 2 and the neuron element 1 is less prone to be turned on.

Hence the following can be carried out by repeatedly inputting identical group information: the neuron element 1 and the synapse determination circuits 2 are caused to learn and store the group information. When identical group information is then inputted, the synapse determination circuits 2 respectively communicate the applied voltages V1 to Vn corresponding to the group information to the gate electrodes 16-1 to 16-n. This enables the neuron element 1 to recognize the group information and turn on in response thereto.

In this description, a case where circular outline image information is stored as group information is taken as an example. This applies also to cases where other information (other types of information), for example, rectangular or linear outline image information is stored. That is, the group information storing and recognizing apparatus includes a neuron element 1 capable of learning a plurality of types of group information representing various patterns and responding only when an identical pattern is inputted. A group information storing and recognizing apparatus capable of recognizing and responding to various patterns can be implemented by taking the following measure: a neuron element 1 and synapse determination circuits 2 are taken as one set; a plurality of the sets are prepared; and each set including one neuron element 1 and synapse determination circuits 2 is caused to learn each of a plurality of types of group information representing various patterns. Therefore, such a group information storing and recognizing apparatus can also be used to materialize artificial intelligence.

(Second Embodiment)

A description will be given to a second embodiment of the present disclosure. In this embodiment, unlike the first embodiment, the first and second MOSFETs 21, 22 of each synapse determination circuit 2 are formed over the same substrate as a neuron element 1. The other respects are the same as those in the first embodiment and the description will be given only to differences from the first embodiment.

Figure 6:
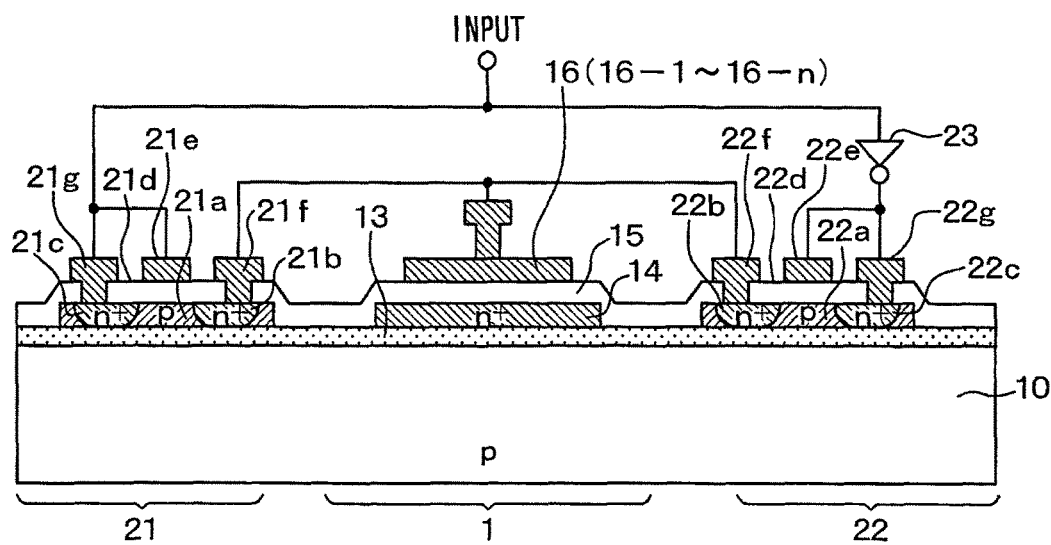
FIG. 6 is a sectional view of a configuration in which a neuron element and a part of a synapse determination circuit are formed using an identical substrate, described in a second embodiment of the present disclosure.

As illustrated in FIG. 6, a first MOSFET 21 and a second MOSFET 22 provided in a synapse determination circuit 2 are formed on both sides of a neuron element 1. In this example, the first and second MOSFETs 21, 22 are arranged perpendicularly to the direction of arrangement of the source-drain of the neuron element 1. FIG. 6 is equivalent to a drawing obtained by cutting the neuron element 1 shown in FIG. 1 in parallel to the direction of the normal to the page. For this reason, the source region 11 or the drain region 12 is not found in the cross-section and the source region 11 and the drain region 12 are arranged in the direction of the normal to the page of FIG. 6.

The first MOSFET 21 is formed over a gate insulating film 13 formed over a p-type semiconductor substrate 10 and in this example, it is of n channel type.

A polysilicon film 21a doped with an impurity is formed over the gate insulating film 13. In this embodiment, the polysilicon film 21a is so structured that it is lightly doped with a p-type impurity. The polysilicon film 21a is equivalent to the second semiconductor layer in the present disclosure. When the floating gate electrode 14 is formed of a polysilicon film, it can be simultaneously formed. In this case, the following is implemented by using different masks to dope an impurity: the polysilicon film 21a and the floating gate electrode 14 are made different from each other in impurity doped thereinto or concentration.

The following are also formed in the polysilicon film 21a: a source region 21b and a drain region 21c heavily doped with an impurity of a conductivity type different from that of the impurity doped into the polysilicon film 21a. The source region 21b and drain region 21c are equivalent to the second source region and second drain region in the present disclosure and formed at a predetermined distance from each other. A ferroelectric film 21d which functions also as a gate insulating film is placed over the surface of the polysilicon film 21a. The ferroelectric film 21d is equivalent to the second dielectric film in the present disclosure and a gate electrode 21e equivalent to the second gate electrode in the present disclosure is formed over the surface of the ferroelectric film 21d. A source electrode 21f is coupled to the source region 21b and a drain electrode 21g is coupled to the drain region 21c through contact holes formed in the ferroelectric film 21d. Input voltage VI1 to VIn is inputted to the gate electrode 21e and the drain electrode 21g, and the source electrode 21f is coupled to the multi-input gate electrode 16 of the neuron element 1. The first MOSFET 21 is thus configured.

The second MOSFET 22 is also formed over the gate insulating film 13 formed over the p-type semiconductor substrate 10 and in this example, it is of n channel type.

A polysilicon film 22a doped with an impurity is formed over the gate insulating film 13. In this embodiment, the polysilicon film 22a is so structured that it is lightly doped with a p-type impurity. The polysilicon film 22a is equivalent to the third semiconductor layer in the present disclosure. When the floating gate electrode 14 is formed of a polysilicon film, it can be simultaneously formed. In this case, the following is implemented by using different masks to dope an impurity: the polysilicon film 22a and the floating gate electrode 14 are made different from each other in impurity doped thereinto or concentration.

The following are also formed in the polysilicon film 22a: a source region 22b and a drain region 22c heavily doped with an impurity of a conductivity type different from that of the impurity doped into the polysilicon film 22a. The source region 22b and drain region 22c are equivalent to the third source region and third drain region in the present disclosure and formed at a predetermined distance from each other. A ferroelectric film 22d which functions also as a gate insulating film is placed over the surface of the polysilicon film 22a. The ferroelectric film 22d is equivalent to the third dielectric film in the present disclosure and a gate electrode 22e equivalent to the third gate electrode in the present disclosure is formed over the surface of the ferroelectric film 22d. A source electrode 22f is coupled to the source region 22b and a drain electrode 22g is coupled to the drain region 22c through contact holes formed in the ferroelectric film 22d. The voltage obtained by inverting input voltage VI1 to VIn is inputted to the gate electrode 22e and the drain electrode 22g through a NOT circuit 23; and the source electrode 22f is coupled to the multi-input gate electrode 16 of the neuron element 1. The second MOSFET 22 is thus configured.

As mentioned above, a part of the synapse determination circuit 2 can be formed over the same substrate as the neuron element 1 is. A group information storing and recognizing apparatus equipped with a neuron element 1 and synapse determination circuits 2 is simplified.

(Third Embodiment)

A description will be given to a third embodiment of the present disclosure. In this embodiment, unlike the second embodiment, the NOT circuit 23 of each synapse determination circuit 2 is also formed over the same substrate as the neuron element 1 is. The other respects are the same as those in the second embodiment and the description will be given only to differences from the second embodiment.

Figure 7:
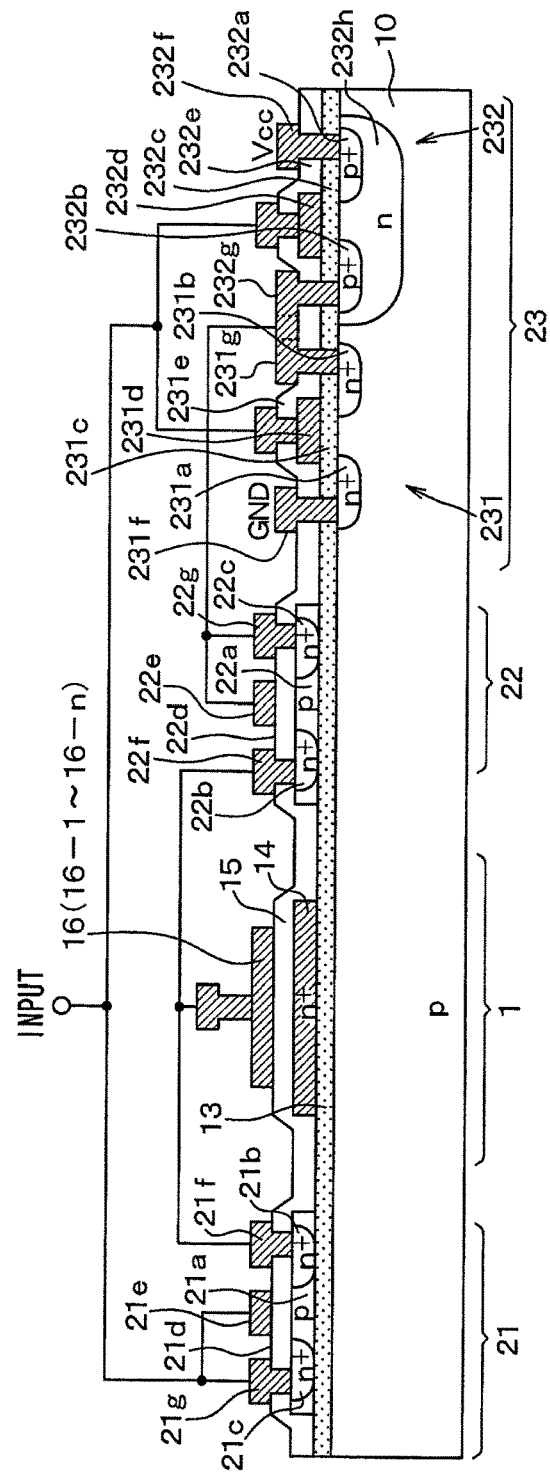
FIG. 7 is a sectional view of a configuration in which a neuron element and a synapse determination circuit are formed using an identical substrate, described in a third embodiment of the present disclosure.

In this embodiment, as illustrated in FIG. 7, the NOT circuit 23 is formed using a p-type semiconductor substrate 10. In this example, the NOT circuit 23 is comprised of a CMOS inverter including an n channel MOSFET 231 and a p channel MOSFET 232.

The n channel MOSFET 231 is provided on the opposite side of the neuron element 1 with the second MOSFET 22 in-between. A source region 231a and a drain region 231b comprised of an $n^+$-type diffusion layer are formed at a predetermined distance from each other in the surface part of the p-type semiconductor substrate 10. Of the surface of the p-type semiconductor substrate 10, the area between the source region 231a and the drain region 231b is taken as a channel. In the surface of the channel, a gate insulating film 231c is provided and a gate electrode 231d is provided over the gate insulating film 231c. An interlayer insulating film 231e is formed over the gate electrode 231d. A source electrode 231f is coupled to the source region 231a, and a drain electrode 231g is coupled to the drain region 231b, through contact holes formed in the interlayer insulating film 231e. Input voltage VI1 to VIn is inputted to the gate electrode 231d.

A p channel MOSFET 232 is also provided on the opposite side of the neuron element 1 with the second MOSFET 22 in-between and placed adjacently to the n channel MOSFET 231. An n-type well layer 232h is formed in the surface part of the p-type semiconductor substrate 10. A source region 232a and a drain region 232b comprised of a $p^+$-type diffusion layer are formed at a predetermined distance from each other in the surface part of the n-type well layer 232h. Of the surface of the p-type well layer 232h, the area between the source region 232a and the drain region 232b is taken as a channel. A gate insulating film 232c is provided over the surface of the channel and a gate electrode 232d is provided over the gate insulating film 232c. An interlayer insulating film 232e is formed over the gate electrode 232d. A source electrode 232f is coupled to the source region 232a, and a drain electrode 232g is coupled to the drain region 232b, through contact holes formed in the interlayer insulating film 232e. Input voltage VI1 to VIn is inputted to the gate electrode 232d.

The NOT circuit 23 comprised of a CMOS inverter including the p channel MOSFET 231 and the n channel MOSFET 232 is thus configured. When supply voltage Vcc is applied to the source electrode 232f of the p channel MOSFET 232 and the source electrode 232f of the n channel MOSFET 232 is coupled to GND, the NOT circuit 23 is actuated.

As mentioned above, it is possible to form the first and second MOSFETs 21, 22 and NOT circuit 23 included in the synapse determination circuit 2 over the same substrate as the neuron element 1 is. This makes it possible to further simplify a group information storing and recognizing apparatus equipped with a neuron element 1 and a synapse determination circuit 2.

(Other Embodiments)

In the above description, image outline information is taken as an example of group information. This example is taken just as an example suitable for automatic operation in vehicles using the group information storing and recognizing apparatus. The group information storing and recognizing apparatus may be caused to learn, store, and recognize any other group information. The above-mentioned structures of the neuron element 1 and the synapse determination circuits 2 are just an example and any other structure which brings about the same action and effect may be adopted. In the structures of the above-mentioned embodiments, though the surface part of the p-type semiconductor substrate 10 is a semiconductor layer in which a channel is formed, it only has to be a semiconductor substrate including at least a semiconductor layer in which a channel is formed and it may be so structured that a p-type semiconductor layer is formed in an n-type semiconductor substrate. In case p-type is taken as a first conductivity type and n-type is taken as a second conductivity type, the following measure is taken in each of the above-mentioned embodiments: the semiconductor substrate is of first conductivity type and the source region 11 and drain region 12 are of second conductivity type. The conductivity type of each of these constituent elements may be inverted.

In the above description of each embodiment, a case where group information is stored in the neuron elements 1 and the synapse determination circuits 2 by repeatedly inputting the group information beforehand is taken as an example. This is also just an example. Instead, a plurality of different types of group information inputted after the product is shipped may be stored individually in a plurality of sets each of which includes one neuron element 1 and corresponding synapse determination circuits 2.

In place of the synapse determination circuit 2, the following measure may be taken: in places where of information items contained in group information, those of high level are recognized, only excitatory synapses are placed; and in places where those of low level are recognized, only inhibitory synapses are placed. For example, in the case of a configuration in which image information to be recognized is divided into a plurality of image regions and inputted to synapse determination circuits 2, the following measure may be taken: excitatory synapses are provided with respect to image regions corresponding to a shape to be recognized as image information; and inhibitory synapses are provided with respect to the remaining image regions. This makes it possible to obtain a group information storing and recognizing apparatus with which group information to be recognized without fail is stored.

In the above-mentioned embodiments, the following measure is taken: both the neuron element 1 and the synapse determination circuit 2 are provided with the ferroelectric films 15, 21d, 22d; and when "1" is repeatedly inputted, electric charges are accumulated and group information is thereby stored. However, even though only the synapse determination circuits 2 are provided, group information can be stored in the synapse determination circuits 2 and recognized by the excitatory synapses and inhibitory synapses provided in the synapse determination circuits 2. For this reason, the neuron element 1 only has to be so structured that it responds and is turned on when identical group information is inputted based on applied voltage Vi to Vn communicated from the synapse determination circuits 2. Therefore, as illustrated in FIG. 8, the neuron element 1 may be configured using such a dielectric film 18 that electric charges are not accumulated according to the number of times of application of applied voltage Vi to Vn, in place of the ferroelectric film 15. The number of times of application may be equivalent to an application count or how many times an application is conducted.

In the above description of embodiments, though structure in which gate electrodes 16-1 to 16-n are arranged in the direction of arrangement of the source region 11 and the drain region 12, this is also just an example. Any other arrangement may be adopted as long as gate electrodes 16-1 to 16-n are placed at intervals between the source region 11 and the drain region 12.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An electronic apparatus comprising:
   a neuron element including a first field-effect transistor that includes a semiconductor substrate including a first semiconductor layer where a channel is formed,
      a first source region and a first drain region formed in a surface part of the first semiconductor layer,
      a gate insulating film formed over the channel,
      a floating gate electrode formed over the gate insulating film,
      a first ferroelectric film formed over the floating gate electrode and accumulating electric charges according to the number of times of voltage application, and
      a multi-input gate electrode including a plurality of gate electrodes arranged at intervals over the first ferroelectric film; and
   a plurality of synapse circuits,
   each synapse circuit that is configured to receive, from one of a plurality of image regions of an information input part, an input voltage of a high level signal or a low level signal that is lower than the high level signal,
   each synapse circuit being electrically connected to one of the plurality of gate electrodes of the multi-input gate electrode of the neuron element,
   each synapse circuit including
      a second field-effect transistor that includes a second ferroelectric film in which charge from the high level signal accumulates and that turns ON after a predetermined amount of charge from the high level signal accumulates on the second ferroelectric film,
   wherein after the second field-effect transistor is turned ON, an input of either the high level signal or the low level signal is transmitted directly to one of the plurality of gate electrodes of the multi-gate electrode to cause the synapse circuit to function as a signal through circuit, and
      a NOT gate that is electrically connected in parallel to the second field-effect transistor, that is configured to convert the high level signal to an inverted low-level signal and the low level signal to an inverted high-level signal and that includes an input and an output, and
      a third field-effect transistor that is electrically connected to the output of the NOT gate in series to receive the inverted low-level signal or the inverted high-level signal,
   the third field-effect transistor that includes a third ferroelectric film in which charge from the inverted high-level signal accumulates, and that turns ON after a predetermined amount of charge from the inverted high-level signal output by the NOT gate accumulates on the third ferroelectric film,
   wherein after the third field-effect transistor is turned ON, an input of either the inverted high-level signal or the inverted low-level signal from the NOT gate to the third field-effect transistor is transmitted directly to one of the plurality of gate electrodes of the multi-gate electrode, so that an input of either the high level signal or the low level signal to the NOT gate is transmitted inversely to one of the plurality of gate electrodes of the multi-gate electrode via the third field-effect transistor to cause the synapse circuit to function as a signal inverted circuit.

2. The electronic apparatus according to claim 1, wherein:
when all inputs from the plurality of image regions of the information input part to the respective synapse circuits are maintained unchanged after turning ON, all output signals of the plurality of synapse circuits to the respective gate electrodes of the multi-gate electrode each continue to be the high level signal regardless whether each of the synapse circuits functions as the signal through circuit or the signal inverted circuit, to cause the neuron element to be prone to turn ON; and
when any one of all inputs from the plurality of image regions to the respective synapse circuits is changed after turning ON, an output of a corresponding synapse circuit among the plurality of synapse circuits to a corresponding gate electrode among the plurality of gate electrodes of the multi-gate electrode becomes the low level signal regardless of whether each of the synapse circuits functions as the signal through circuit or the signal inverted circuit, to cause the neuron element to be less prone to turn ON.

3. The electronic apparatus according to claim 1, wherein:
the output of the NOT gate is connected to a common node shared by two terminals of the second field effect transistor.

* * * * *